United States Patent [19]

Coogan et al.

[11] Patent Number: 4,992,507

[45] Date of Patent: Feb. 12, 1991

[54] AQUEOUS DISPERSION OF A NONIONIC, WATER-DISPERSIBLE POLYURETHANE

[75] Inventors: Richard G. Coogan, North Reading; Razmik Vartan-Boghossian, Belmont; Milton Lapkin, Sudbury, all of Mass.

[73] Assignee: ICI Americas, Inc., Wilmington, Del.

[21] Appl. No.: 408,958

[22] Filed: Sep. 18, 1989

Related U.S. Application Data

[63] Continuation of Ser. No. 244,394, Sep. 14, 1988, abandoned.

[30] Foreign Application Priority Data

Sep. 14, 1987 [GB] United Kingdom ............... 8721534
Sep. 14, 1987 [GB] United Kingdom ............... 8721535

[51] Int. Cl.$^5$ .................. C08L 75/00; C08L 75/04
[52] U.S. Cl. ................................ 524/591; 524/839; 524/589
[58] Field of Search ................ 524/591, 839, 589

[56] References Cited

U.S. PATENT DOCUMENTS

| | | | |
|---|---|---|---|
| 3,412,054 | 11/1968 | Milligan et al. | 524/591 |
| 3,479,310 | 11/1969 | Dieterich et al. | 524/591 |
| 3,756,992 | 9/1973 | Dieterich | 524/591 |
| 3,905,929 | 9/1975 | Noll | 524/839 |
| 3,920,598 | 11/1975 | Reiff et al. | 524/871 |
| 4,045,396 | 8/1977 | Marans et al. | 528/72 |
| 4,116,061 | 10/1986 | Henning et al. | 524/591 |
| 4,258,222 | 3/1981 | Mohring et al. | 568/863 |
| 4,408,008 | 10/1983 | Markusch | 524/591 |
| 4,569,981 | 2/1986 | Wenzel et al. | 528/67 |
| 4,622,360 | 11/1986 | Gomi et al. | 524/507 |
| 4,670,100 | 6/1987 | Henning et al. | 524/591 |
| 4,701,480 | 10/1987 | Markusch et al. | 524/591 |
| 4,764,553 | 8/1988 | Mosbach et al. | 524/591 |
| 4,857,565 | 8/1989 | Henning et al. | 524/591 |

*Primary Examiner*—Morton Foelak
*Assistant Examiner*—Dennis R. Daley
*Attorney, Agent, or Firm*—Cushman, Darby & Cushman

[57] ABSTRACT

An aqueous dispersion of a nonionic, water-dispersible polyurethane having pendent polyoxyethylene chains and free acid or free tertiary amino groups. The dispersions are useful as coating compositions.

15 Claims, No Drawings

AQUEOUS DISPERSION OF A NONIONIC, WATER-DISPERSIBLE POLYURETHANE

This is a continuation of application Ser. No. 07/244,394, filed Sept. 14, 1988, which was abandoned upon the filing hereof.

This invention relates to aqueous dispersions and more particularly to aqueous dispersions of nonionic polyurethanes containing free acid or free tertiary amino groups and to the use of the dispersions as coating compositions.

Aqueous polyurethane dispersions are well known and are used in the production of useful polyurethane products, for example coatings and films. Dispersion of the polyurethane in the aqueous system has been achieved by the use of either external or internal dispersing or emulsifying agents but, in general, the internal agents, which can be ionic or nonionic, have been found to be more satisfactory.

Water-dispersible polyurethanes of nonionic character generally owe their dispersibility to the presence of pendent polyoxyethylene chains along the main polyurethane backbone. Thus, U.S. Pat. No. 3,905,929 describes water-dispersible nonionic polyurethanes obtained by reacting an organic diisocyanate with an organic difunctional isocyanate-reactive compound and with an organic difunctional isocyanate-reactive compound containing side chain polyethylene oxide units. Aqueous dispersions containing the polyurethanes are used in the production of films and coatings. In the process of U.S. Pat. No 3,920,598, the polyethylene oxide chain is incorporated by being attached to a diisocyanate molecule by means of an allophanate or biuret linkage.

German Offenlegungsschrift No. 2551094 describes water-dispersible polyurethanes which contain both ionic and nonionic hydrophilic groups, the ionic centres being quaternary ammonium, carboxylate or sulphonate ions which are associated with appropriate salt-forming counter-ions.

It has now been found that aqueous dispersions of nonionic, water-dispersible polyurethanes containing free acid or free tertiary amino groups, that is to say unneutralised acid or tertiary amino groups, have excellent storage stability and can be used in the preparation of linear or crosslinked polyurethanes of various types.

Accordingly, the invention provides an aqueous dispersion of a nonionic, water-dispersible polyurethane having pendent polyoxyethylene chains and free acid or free tertiary amino groups.

For the purpose of the invention, an "aqueous dispersion" means a dispersion of the polyurethane in an aqueous medium of which water is the principal ingredient. Minor amounts of organic solvents may optionally be present.

The pendent polyoxyethylene chain content of the water-dispersible polyurethane may vary within wide limits but in all cases should be sufficient to provide the polyurethane with the required degree of water dispersibility. The polyoxyethylene side chains may be introduced into the polyurethane by methods described in the prior art. Thus, the polyurethane-forming ingredients may include one or more components having pendent polyoxyethylene chains, for example a diol and/or diisocyanate having a poly(ethylene oxide) side chain as described in U.S. Pat. Nos. 3,905,929 or 3,920,598.

A free acid content may be introduced into the polyurethane by including at an appropriate point in its synthesis at least one component having at least one free acid group and at least two groups, for example hydroxyl groups, which are more reactive than the acid groups towards isocyanate groups. In view of the essentially nonionic character of the polyurethane, the free acid groups should not ionise to any substantial extent during storage or use of the dispersions. Particularly suitable acid groups are carboxylic acid groups. The free acid group content of the polyurethane is suitably in the range from 5 to 185 milliequivalents per 100 g, preferably from 10 to 100 milliequivalents per 100 g.

A tertiary amino content may be introduced into the polyurethane by including among the polyurethane-forming components at least one component having at least one tertiary amino group and at least two isocyanate-reactive groups. The free tertiary amino group content of the polyurethane is suitably in the range from 8 to 180 milliequivalents per 100 g, preferably from 15 to 100 milliequivalents per 100 g.

The water-dispersible polyurethane may be linear or branched, branching being introduced by including among the polyurethane-forming components at least one component having more than two isocyanate or isocyanate-reactive groups per molecule. The degree of branching may be as high as one crosslink for each 3000 atomic weight units.

It will be appreciated by those skilled in the art that polyurethane formulations frequently contain minor proportions of reactants, such as water or diamines, which introduce urea groups rather than urethane groups into the overall polyurethane structure. For the purpose of calculating crosslink densities of the product of the present invention, such reactants are regarded as polyurethane-forming components.

A suitable free acid group containing water-dispersible polyurethane is the reaction product of:
(A) a nonionic, water-dispersible, isocyanate-terminated polyurethane prepolymer formed by reacting:
  (i) an organic polyisocyanate;
  (ii) at least one organic polyol having a molecular weight in the range 62 to 6000;
  (iii) a dispersing diol and/or diisocyanate having a pendent polyoxyethylene chain, and
  (iv) an isocyanate-reactive compound containing at least one carboxylic acid group and at least two groups which are more reactive than carboxylic acid groups towards isocyanate groups; and
(B) an active hydrogen containing chain extender, A suitable free tertiary amino group containing water-dispersible polyurethane is the reaction product of:
(A) a nonionic, water-dispersible, isocyanate-terminated polyurethane prepolymer formed by reacting:
  (i) an organic polyisocyanate;
  (ii) at least one organic polyol having a molecular weight in the range 62 to 6000, and
  (iii) a dispersing diol and/or diisocyanate having a pendent polyoxyethylene chain; and
(B) an active hydrogen containing chain extender, wherein at least one polyol and/or chain extender contains a free tertiary amino group.

The polyisocyanate used in making the prepolymer may be an aliphatic, cycloaliphatic, araliphatic or aromatic polyisocyanate. Examples of suitable polyisocyanates include ethylene diisocyanate, 1,6-hexamethylene diisocyanate, isophorone diisocyanate, cyclohexane-1,4-diisocyanate, 4,4'-dicyclohexylmethane diisocyanate, p-xylylene diisocyanate, 1.4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenyl polyisocyanates and 1,5-naphthylene diisocyanate. Mixtures of polyisocyanates can be used and also polyisocyanates which have been modified by the introduction of urethane, allophanate, urea, biuret, carbodiimide, uretonimine or isocyanurate residues.

Organic polyols having molecular weights in the range 62–6000 which may be used in the preparation of the prepolymer particularly include diols and triols and mixtures thereof but higher functionality polyols may be used, for example as minor components in admixture with diols. The polyols may be polymeric polyols having molecular weights in the range 400 to 6000 or low molecular weight polyols having molecular weights below depending upon the degree of flexibility desired in the final product. Mixtures of polymeric and/or low molecular weight polyols may be used.

Thus, a particularly useful free acid group containing nonionic water-dispersible polyurethane is the reaction product of:
(A) a nonionic, water-dispersible, isocyanate-terminated polyurethane prepolymer formed by reacting:
  (i) an organic polyisocyanate;
  (ii) a polymeric polyol having a molecular weight in the range 400 to 6000;
  (iii) a dispersing diol and/or diisocyanate having a pendent polyoxyethylene chain, and
  (iv) an isocyanate-reactive compound containing at least one carboxylic acid group and at least two groups which are more reactive than carboxylic acid groups towards isocyanate groups; and optionally,
  (v) a low molecular weight polyol having a molecular weight less than 400; and
(B) an active hydrogen containing chain extender.

A particularly useful nonionic free tertiary amino group containing water-dispersible polyurethane is the reaction product of:
(A) a nonionic, water-dispersible, isocyanate-terminated polyurethane prepolymer formed by reacting:
  (i) an organic polyisocyanate;
  (ii) a polymeric polyol having a molecular weight in the range 400 to 6000;
  (iii) a dispersing diol and/or diisocyanate having a pendent polyoxyethylene chain; and optionally
  (iv) a low molecular weight organic polyol having a molecular weight less than 400; and
(B) an active hydrogen containing chain extender, wherein at least one polyol and/or chain extender contains a free tertiary amino group.

The polymeric polyols may be members of any of the chemical classes of polymeric polyols used or proposed to be used in polyurethane formulations. In particular, they may be polyesters, polyesteramides, polyethers, polythioethers, polycarbonates, polyacetals, polyolefins or polysiloxanes. Where appropriate, the polyols may contain free tertiary amino groups. Preferred molecular weights are from 700 to 3000.

Polyester polyols which may be used include hydroxyl-terminated reaction products of polyhydric alcohols such as ethylene glycol, propylene glycol, diethylene glycol, neopentyl glycol, 1,4-butanediol, furan dimethanol, cyclohexane dimethanol, glycerol, trimethylolpropane or pentaerythritol or mixtures thereof with polycarboxylic acids, especially dicarboxylic acids or their ester-forming derivatives, for example succinic, glutaric and adipic acids or their dimethyl esters, phthalic anhydride or dimethyl terephthalate. Polyesters obtained by the polymerisation of lactones, for example caprolactone, in conjunction with a polyol may also be used. Polyesteramides may be obtained by the inclusion of amino-alcohols such as ethanolamine in polyesterification mixtures. Polyesters containing free tertiary amino groups may be obtained by including tertiary amino polyols, for example triethanolamine or N-methyldiethanolamine in the polyesterification reaction.

Polyether polyols which may be used include products obtained by the polymerisation of a cyclic oxide, for example ethylene oxide, propylene oxide or tetrahydrofuran or by the addition of one or more such oxides to polyfunctional initiators, for example water, ethylene glycol, propylene glycol, diethylene glycol, cyclohexane dimethanol, glycerol, trimethylolpropane, pentaerythritol or Bisphenol A. Especially useful polyethers include polyoxypropylene diols and triols, poly(oxyethylene-oxypropylene) diols and triols obtained by the simultaneous or sequential addition of ethylene and propylene oxides to appropriate initiators and polytetramethylene ether glycols obtained by the polymerisation of tetrahydrofuran. Polyethers containing free tertiary amino groups may be obtained by the oxyalkylation, for example oxypropylation, of ammonia, primary or secondary amines and aminoalcohols. Examples of suitable amines include ethylene diamine, aniline, benzylamine, toluene diamines, diaminodiphenylmethane and polymethylene polyphenyl polyamines. Suitable aminoalcohols include ethanolamine, diethanolamine, triethanolamine, N-methyldiethanolamine, bis(2-hydroxyethyl)aniline, bis(2-hydroxypropyl)aniline and bis(2-hydroxyethyl)benzylamine. In the oxyalkylation process, mixtures of amino-containing and amino-free initiators may be used if desired.

Polythioether polyols which may be used include products obtained by condensing thiodiglycol either alone or with other glycols, dicarboxylic acids, formaldehyde, aminoalcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol and hexanediol with formaldehyde. Suitable polyacetals may also be prepared by polymerising cyclic acetals.

Suitable polyolefin polyols include hydroxy-terminated butadiene homo- and copolymers.

Organic polyols having molecular weights below 400 which may be used in the preparation of the prepolymers particularly include diols and triols and mixtures thereof but higher functionality polyols may be used. Examples of such lower molecular weight polyols include ethylene glycol, diethylene glycol, tetraethylene glycol, bis(hydroxyethyl) terephthalate, cyclohexane dimethanol, furan dimethanol, glycerol and the reaction products, up to molecular weight 399 of such polyols with propylene oxide and/or ethylene oxide. Tertiary amino group containing polyols such as triethanolamine, tetrakis(hydroxypropyl) ethylene diamine or the lower molecular weight oxyalkylation products of ammonia, amines and amino-alcohols may be used when preparing the free tertiary amino group containing products.

Diols having pendent polyoxyethylene chains which may be used in the preparation of the prepolymer include those described in the prior art, for example in U.S. Pat. No. 3,905,929. These diols, because of their function, may be regarded as dispersing diols. Particularly suitable dispersing diols may be obtained by reacting one mole of an organic diisocyanate in which the two isocyanate groups have different reactivities with approximately one mole of a polyethylene glycol mono ether and then reacting the adduct so obtained with approximately one mole of a dialkanolamine, for example diethanolamine.

Diisocyanates having groups of different reactivity which may be used in the preparation of the dispersing diols include 2,4-toluene diisocyanate, isophorone diisocyanate and 2,4'diphenylmethane diisocyanate. Polyethylene glycol monoethers which may be used include the reaction products of ethylene oxide with monohydric alcohols such as methanol, ethanol, tertiary butanol or benzyl alcohol or phenols such as phenol itself. The polyethylene glycol monoethers suitably have molecular weights in the range 250 to 3000 and preferably in the range 500 to 2000.

If desired, the polyoxyethylene chains may contain units of other alkylene oxides in addition to the ethylene oxide units. Thus, polyoxyalkylene chains in which up to 60% of the alkylene oxide units are propylene oxide units, the remainder being ethylene oxide units, may be used.

The preparation of the dispersing diols may be achieved by adding the polyethylene glycol monoether to the diisocyanate at 20°-25° C., optionally in the presence of an inert solvent and a urethane catalyst, followed by addition of the dialkanolamine.

Diisocyanates having pendent polyoxyethylene chains which may be used in the preparation of the prepolymer include those described in the prior art, for example in U.S. Pat. No. 3,920,598. These diisocyanates, because of their function, may be regarded as dispersing diisocyanates. Particularly suitable dispersing diisocyanates may be obtained by reacting two moles of an organic diisocyanate in which the two isocyanate groups have different reactivities with approximately one mole of a polyethylene glycol mono-ether, the initially formed urethane monoisocyanate then reacting at a higher temperature with the excess diisocyanate to form an allophanate diisocyanate having a pendent polyoxyethylene chain Suitable diisocyanates and polyethylene glycol monoethers for use in preparing the dispersing diisocyanates have been mentioned above for the preparation of the dispersing diols.

The carboxy group containing isocyanate-reactive compound, which may be used in preparing the free acid group contining products, is preferably a carboxy group containing diol or triol for example a dihydroxy alkanoic acid of the formula:

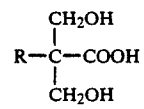

wherein R is hydrogen or alkyl. The preferred carboxy containing diol is 2,2-dimethylol propionic acid. If desired, the carboxy containing diol or triol may be incorporated into a polyester by reaction with a dicarboxylic acid before being incorporated into the prepolymer. Useful materials include the fumarate polyether glycols described in U.S. Pat. No. 4,460,738. Other useful carboxy-containing compounds include aminocarboxylic acids, for example lysine, cystine and 3,5-diaminobenzoic acid.

The nonionic, water dispersible, isocyanate-terminated polyurethane prepolymer may be prepared in conventional manner by reacting a stoichiometric excess of the organic polyisocyanate with at least one polyol having a molecular weight in the range 62 to 6000, the dispersing diol or diisocyanate, and, where necessary, the carboxy containing diol or triol under substantially anhydrous conditions at a temperature between about 30° C. and about 130° C. until reaction between the isocyanate groups and the hydroxyl groups is substantially complete. The polyisocyanate component and the active hydrogen containing component are suitably reacted in such proportions that the ratio of number of isocyanate groups to the number of hydroxyl groups is in the range from about 1.1:1 to about 6:1. preferably within the range of from 1.5:1 to 3:1.

If desired, catalysts such as dibutyltin dilaurate and stannous octoate may be used to assist prepolymer formation although any tertiary amino groups present in the components can be expected to have a catalytic effect. A non-reactive solvent may be added before or after prepolymer formation to control the viscosity. Suitable solvents which may be used include acetone, methylethylketone, dimethylformamide, ethylene carbonate, propylene carbonate, diglyme, N-methylpyrrolidone, ethyl acetate, ethylene and propylene glycol diacetates, alkyl ethers of ethylene and propylene glycol monoacetates, toluene, xylene and sterically hindered alcohols such as t-butanol and diacetone alcohol. The preferred solvents are water-miscible solvents such as N-methylpyrrolidone, dimethyl sulphoxide and dialkyl ethers of glycol acetates or mixtures of N-methylpyrrolidone and methyl ethyl ketone.

The aqueous dispersions of the invention may be prepared by dispersing the nonionic water-dispersible isocyanate terminated polyurethane prepolymer in an aqueous medium and chain extending the prepolymer with an active hydrogen containing chain extender. The prepolymer may be dispersed in water using techniques well known in the art. Preferably, the prepolymer is added to the water with agitation or, alternatively, water may be stirred into the prepolymer.

The active hydrogen containing chain extender which is reacted with the prepolymer is suitably a polyol, an amino-alcohol, ammonia, a primary or secondary aliphatic, alicyclic, aromatic, araliphatic or heterocyclic amine, especially a diamine, hydrazine or a substituted hydrazine. Water-soluble chain extenders are preferred, and water itself may be effective.

Examples of suitable chain extenders useful herein include ethylene diamine, diethylene triamine, triethylene tetramine, propylene diamine, butylene diamine, hexamethylene diamine, cyclohexylene diamine, piperazine, 2-methyl piperazine, phenylene diamine, tolylene diamine, xylylene diamine, tris(2-aminoethyl) amine, 3,3'-dinitrobenzidine,4,4'-methylenebis (2-chloroaniline), 3,3'dichloro-4,4'-bi-phenyl diamine, 2,6-diaminopyridine, 4,4'-diaminodiphenylmethane, menthane diamine, m-xylene diamine and isophorone diamine. Also materials such as hydrazine, azines such as acetone azine, substituted hydrazines such as, for example, dimethyl hydrazine, 1,6-hexamethylene-bishydrazine, carbodihydrazine, hydrazines of dicarboxylic acids and sulfonic acids such as adipic acid mono- or or dihydrazide, oxalic acid dihydrazide, isophthalic acid dihydrazide, tartaric acid dihydrazide, 1,3-phenylene disulfonic acid dihydrazide, omega-amino-caproic acid dihydrazide, hydrazides made by reacting lactones with hydrazine such as gamma-hydroxylbutyric hydrazide, bis-semi-carbazide, bis-hydrazide carbonic esters of glycols such as any of the glycols mentioned above. Tertiary amino group containing chain extenders which may be used in preparing the free tertiary amino group containing products include triethanolamine, N-methyldiethanolamine, bis(2-hydroxyethyl) benzylamine, bis(2-hydroxypropyl) aniline and 3,3'-diamino-N-methyldipropylamine.

Where the chain extender is other than water, for example a polyol, polyamine or hydrazine, it may be added to the aqueous dispersion of prepolymer or, alternatively, it may already be present in the aqueous medium when the prepolymer is dispersed therein.

The chain extension can be conducted at elevated, reduced or ambient temperatures. Convenient temperatures are from about 5° to 95° C. or more, preferably from about 10° to about 45° C.

The amount of chain extender employed should be approximately equivalent to the free-NCO groups in the prepolymer, the ratio of active hydrogens in the chain extender to NCO groups in the prepolymer preferably being in the range from 1.0 to 2.0:1. Of course, when water is employed as the chain extender, these ratios will not be applicable since the water, functioning both as chain extender and dispersing medium, will be present in a gross excess relative to the free-NCO groups.

The aqueous dispersions of the invention may be advantageously employed as coating compositions, for which purpose they may be further diluted with water and/or organic solvent, or they may be supplied in more concentrated form by evaporation of water and/or organic components of the liquid medium. As coating compositions, they may be applied to any substrate including wood, metals, glass, cloth, leather, paper, plastics, foam and the like, any conventional method including brushing, dipping, flow coating, spraying, and the like. The compositions may contain other conventional ingredients including organic solvents, pigments, dyes, emulsifiers, surfactants, thickeners, heat stablizers, levelling agents, anti-cratering agents, fillers, sedimentation inhibitors, UV absorbers, antioxidants and the like introduced at any stage of the production process or subsequently. It is possible to include an amount of antimony oxide in the dispersions to enhance the fire retardant properties. The dispersions may also be used as adhesives for materials such as polypropylene, polyester, polyurethane, leather and the like or as binding agents for various particulate materials.

The free acid group containing polyurethane dispersions, which suitably have solids contents of from about 20 to 60% by weight, preferably from about 25 to 40% by weight, are stable over a period of several months. Unlike anionic polymers containing neutralised acid groups, the dispersions are stable at pH values below 7. Thus, they do not gel in the presence of acid catalyst such as p-toluenesulphonic acid. The dispersions are also more compatible with other polymers and may advantageously be blended with other dispersions, for example polyvinyl acetate, polyethylene, polystyrene, polybutadiene, polyvinyl chloride, polyacrylate and other homopolymer and copolymer dispersions.

The properties of the free acid group containing polyurethane may be modified by reacting the free acid groups with various cross-linking agents, for example melamines, isocyanates, carbodiimides, aziridines or epoxides. The crosslinking reactions can take place at room temperature or can be accelerated by heat. The crosslinked polymers are thermoset in nature and have a high degree of solvent resistance.

The free acid group containing polyurethanes can also be cross-linked using polyvalent metal ions, for example aluminium, magnesium, barium, beryllium. cobalt, lead, copper or antimony and especially zinc, zirconium or calcium. This type of cross-linking may be reversed, if desired, by treating the polymer with ammonia or amines, thus facilitating removal of the polyurethane from a substrate.

The free tertiary amino group containing dispersions, which suitably have solids contents of from about 20 to 60% by weight, preferably from about 25 to 40% by weight, are stable over a period of several months. Unlike cationic polymers containing neutralised or quaternised amino groups, the dispersions are stable at pH values above 7. Thus, they do not gel in the presence of an acid catalyst such as p-toluenesulphonic acid. The dispersions are also compatible with other polymers and may advantageously be blended with other dispersions, for example polyvinyl acetate, polyethylene, polystyrene, polybutadiene, polyvinyl chloride, polyacrylate and other homopolymer and copolymer dispersions.

The properties of the free tertiary amino group containing polyurethane may be modified by reacting it with polyhalogenated hydrocarbons so as to quaternise the amino groups and crosslink the polymer. Suitable polyhalogenated hydrocarbons include $\alpha,\alpha'$-dichloro-1,4-xylene, $\alpha,\alpha$-dichloro-1,2-xylene, 1,5-dibromopentane 1,4-dibromobutane and 1,4-dibromobutene diol.

The invention is illustrated but not limited by the following Examples.

EXAMPLE 1

A 500 ml resin flask equipped with thermometer, overhead stirrer and nitrogen was charged with 67.3 g of polypropylene oxide diol of 1000 molecular weight, 45.0 g of dispersing diol, 3.0 g of dimethylol propionic acid (DMPA) dissolved in 87.0 g N-methylpyrrolidone, 46.2 g of isophorone diisocyanate (IPDI) and 0.5 g of dibutyltin dilaurate. The reaction was warmed to 60° C. for three hours until the isocyanate content dropped to 2.60%. A dispersion of the prepolymer was prepared by feeding 240 g of the prepolymer at room temperature into 124 g of deionized water containing 14.0 g of 16% hydrazine. The dispersion was allowed to stir two hours after the addition of prepolymer was complete. The dispersion had a pH of 5.5, viscosity of 8700 cps and a solids content of 42%.

The dispersing diol was prepared as follows: 266.4 g of Methoxycarbowax 750 dissolved in 77.3 g of N-methylpyrrolidone was added to 66.0 g of 2,4-toluene diisocyanate over a thirty minute period at a temperature 30°–40° C. At the end of the reaction, the isocyanate content was 3.52%. The system was cooled to 25° C. and 32 g of diethanol amine was added. The diol had an OH number of 109.

The following urethane dispersions were prepared similarly to Example 1 except different levels of dimethylol propionic acid were used:

|  | 2 | 3 | 4 | 5 | 6 | 7 | 8 |
|---|---|---|---|---|---|---|---|
| PPO-diol | 67.3 | 67.3 | 60.0 | 55.0 | 55.0 | 40.0 | 65.2 |
| Dispersing diol | 50.0 | 50.0 | 50.0 | 50.0 | 55.0 | 32.0 | 50.0 |
| DMPA | 6.0 | 6.0 | 9.6 | 14.5 | 18.4 | 18.0 | 6.0 |
| Trimethylolpropane | — | — | — | — | — | — | 3.0 |
| N-methylpyrrolidone | 94.80 | 94.80 | 97.2 | 104.4 | 114.8 | 87.7 | 103.2 |
| IPDI | 55.80 | 55.80 | 61.3 | 74.2 | 85.0 | 72.2 | 67.6 |
| Hydrazine | — | 3.07 | 2.82 | 3.60 | 4.36 | 3.5 | 3.5 |
| Diethylene triamine | 6.04 | — | — | — | — | — | — |
| Water | 293 | 175.7 | 179.0 | 213.0 | 271.5 | 250.0 | 260.6 |
| % Solid | 32.0 | 40.0 | 40.0 | 37.0 | 35.0 | 32.0 | 35.0 |
| Viscosity/cps | 181 | 7400 | 5100 | 3360 | 2800 | 80.0 | 288 |
| pH | 5.5 | 5.3 | 5.0 | 4.7 | 4.7 | 4.7 | 4.7 |

EXAMPLE 9

A 500 ml resin flask equipped with thermometer, overhead stirrer and nitrogen was charged with 57.7 g of polytetramethylene ether glycol of molecular weight 250 (Poly THF-250), 53.3 g of dispersing diol from Example 1, 6.5 g of dimethylol propionic acid dissolved in 26.2 g of N-methylpyrrolidone, 118.3 g of isophorone diisocyanate and 0.3 g of dibutylin dilaurate. The reaction was warmed to 70° C. for two hours until the isocyanate content dropped to 6.2% (96% of theoretical). The prepolymer at this stage contains 90% non-volatiles. The reaction was cooled to 40° C. and 75 g of t-butanol was added to the prepolymer and mixed for one hour. The NCO content of the prepolymer is 4.73% (95% of theoretical). A dispersion of the prepolymer was prepared by feeding 280 g of the prepolymer at room temperature into 267.2 g of deionized water containing 23.3 g of 16% hydrazine. The dispersion temperature was controlled between 20°–25° C. and was allowed to stir 2 hours at elevated temperature after the addition of prepolymer was complete. The dispersion had a pH of 5.8, solid content of 35% and a viscosity of 185 cps.

EXAMPLE 10

A polyurethane was prepared in a similar manner to Example 9 except diacetone alcohol was used as co-solvent. The following amounts were used to prepare the urethane:

| Polytetramethylene ether glycol (as in Example 9) | 58 |
|---|---|
| Dispersing diol from Example 1 | 53.3 |
| Dimethylol propionic acid | 6.5 |
| N-Methylpyrrolidone | 26.3 |
| Isophorone diisocyanate | 118.3 |
| Dibutyltin dilaurate | 0.3 |
| Diacetone alcohol | 75.0 |
| Hydrazine | 5.9 |
| Water | 445.2 |

The dispersion had a pH of 5.8, solids content of 35% and a viscosity of 46 cps.

EXAMPLE 11

A polyurethane was prepared in a similar manner to Example 9. A mixture of N-methylpyrrolidone and MEK was used as co-solvent. The following amounts were used to prepare the urethane:

| Polytetramethylene ether glycol (as in Example 9) | 58 |
|---|---|
| Dispersing diol from Example 1 | 53.3 |
| Dimethylol propionic acid | 6.5 |
| N-Methylpyrrolidone | 50.6 |
| Methyl ethyl ketone | 50.6 |
| Isophorone diisocyanate | 118.3 |
| Dibutyltin dilaurate | 0.3 |
| Hydrazine | 5.4 |
| Water | 259.2 |

The dispersion had a pH of 5.3, solids content of 40% and a viscosity of 1300 cps.

The dispersing diol used in this Example was prepared as follows:

To a mixture of 1300 g of Methoxycarbowax 750 and 390 g of MEK at 40°–45° C., 301.6 g of 2,4-toluene diisocyanate was added over a thirty minute period. At the end of the reaction, the isocyanate content was 3.6%. The system was cooled to 25° C. and 165.6 g of diethanol amine was added. The diol had an OH number of 109.

EXAMPLE 12

A polyurethane was prepared in a similar manner to Example 1 except bis(4-Isocyanatocyclohexyl)methane (H-MDI) was used. The following amounts were used to prepare the urethane:

| Polypropylene oxide diol (OH number 106.5) | 74.4 |
|---|---|
| Dispersing diol from Example 11 | 38.4 |
| Dimethylolpropionic acid | 2.5 |
| N-Methylpyrrolidone | 32.7 |
| Methyl ethyl ketone | 25.5 |
| bis(4-Isocyanatocyclohexyl)methane | 53 |
| Dibutyltin dilaurate | 0.3 |
| Hydrazine | 2.2 |
| Water | 340.0 |

The dispersion had a pH of 5.8, solids content of 30% and a viscosity of 64 cps.

Improved properties can be achieved by crosslinking the unneutralized carboxyl group from this Example with metal ions such as Cu-(II)-acetate solution.

|  | Shear Strength at 70° C. |
|---|---|
| Linear carboxyl-group containing system | 11 hours |
| Above system crosslinked with Cu(II) Acetate | >500 hours |

EXAMPLE 13

A polyurethane was prepared in a similar manner to Example 1 except toluene diisoocyanate was used. The following amounts were used to prepare the urethane:

| | |
|---|---|
| Polypropylene oxide diol (OH number 112) | 90.0 |
| Dispersing diol from Example 1 | 30.0 |
| Dimethylolpropionic acid | 3.0 |
| N-Methylpyrrolidone | 87.2 |
| Toluene diisocyantate | 39.4 |
| Hydrazine | 2.4 |
| Water | 278.0 |

The dispersion had a pH of 4.4, solids content of 31%, a viscosity of 48 cps and an ethylene oxide content of 12.7%.

The unneutralized carboxyl group of the above system can be crosslinked with Zn-acetate solution to improve the physical properties. Dispersions were poured out to form a film. After the water was completely removed by evaporation, a clear, smooth, elastic film was obtained. The following mechanical properties were obtained:

| | Tensile Strength | Elongation | 100% Modulus |
|---|---|---|---|
| Linear system from Example 13 | 1320 psi | 640% | 138 psi |
| Crosslinked with Zn(II) acetate | 2030 psi | 710% | 220 psi |
| Improved properties | 55% | | 58% |

EXAMPLE 14

A polyurethane was prepared using the following amounts:

| | |
|---|---|
| Polytetramethylene ether glycol (OH number 113) | 130.0 |
| Dispersing diol from Example 1 | 60.0 |
| N-Methylpyrrolidone | 96.0 |
| Methyl ethyl ketone | 19.2 |
| Dimethylolpropionic acid (DMPA) | 10.0 |
| Toluene diisocyanate | 69.2 |
| Hydrazine | 4.0 |
| Water | 294.0 |

The dispersion had a pH of 4.0, solids content of 40%, and a viscosity of 342 cps.

The unneutralized carboxy-group of the above Example was crosslinked with Zn-ammonium-carbonate solution (ZnO 16%, pH=11). The crosslinked system had an excellent pot life. The following improved mechanical properties and water resistance were obtained:

| | Tensile Strength | Elongation | 100% Modulus | 200% Modulus | 300% Modulus |
|---|---|---|---|---|---|
| Linear DMPA containing polyurethane film | 329 psi | 590% | 139 psi | 156 psi | 177 psi |
| Crosslinked with Zn-ammonium-carbonate | 1178 psi | 620% | 380 psi | 456 psi | 551 psi |

WATER SPOT TEST

| | |
|---|---|
| Linear DMAP containing polyurethane coating | Whitening, softening and lots of blisters were observed within the first one minute. |
| Crosslinked with Zn-ammonium-carbonate | No whitening, no blisters but very slight softening after 60 minutes. |
| Crosslinked with aziridine | No whitening, no blisters, no softening and no swelling of the coating after a period of 60 minutes. |
| Crosslinked with expoxy compound | Very slight whitening (recovery within one minute), no softening and no swelling after a period of 30 minutes. |

EXAMPLE 15

A polyurethane was prepared in a similar manner to Example 5 except a different level of co-solvent was used. The following amounts were used to prepare the urethane:

| | |
|---|---|
| Polypropylene oxide diol (mol wt 1000) | 52.0 |
| Dispersing diol from Example 1 | 45.0 |
| Dimethylolpropionic acid | 13.0 |
| N-Methylpyrrolidone | 76.7 |
| Isophorone diisocyanate | 68.5 |
| Dibutyltin dilaurate | 0.4 |
| Hydrazine | 3.5 |
| Water | 259.0 |

The dispersion had a pH of 4.9, solids content of 35% and a viscosity of 420 cps.

The unneutralised carboxyl-group of the above system was crosslinked with Zn-ammonium-carbonate solution. The crosslinked urethane had an excellent pot life. The following mechanical properties were obtained:

| | Tensile Strength | Elongation | 100% Modulus | 200% Modulus |
|---|---|---|---|---|
| Linear DMPA containing polyurethane film | 2337 psi | 220% | 1826 psi | 2034 psi |
| Crosslinked with Zn-ammoniumcarbonate | The coating became very hard and had no elongation | | | |

WATER SPOT TEST

Improved properties against water were also achieved by crosslinking the urethane with ZnO, aziridine and epoxy compounds.

EXAMPLE 16

A 500 ml resin flask equipped with thermometer, overhead stirrer and nitrogen was charged with 67.3 g of polypropylene oxide diol of 1000 molecular weight, 40 g of dispersing diol, 5.47 g of N-methyl diethanolamine, 58 g of N-methylpyrrolidone, 11.9 g of methyl ethyl ketone, 52.8 g isophorone diisocyanate and 0.2 g of dibutyltin dilaurate. The reaction was allowed to exotherm to 40°–45° C. After exotherm was complete, the reaction was stirred an additional hour until temperature dropped to room temperature. The NCO content of the prepolymer was 3.10%.

A dispersion of the polymer was prepared by feeding 200 g of the prepolymer at room temperature into 141.5 g of deionized water containing 14.3 g of 16% hydrazine The dispersion temperature was controlled at 30° C. and was allowed to stir two hours after the addition of prepolymer was complete. The dispersion had a pH of 7.8, viscosity of 570 cps, and a solids content of 40%.

The dispersing diol used in this example was prepared as follows:

To 500 g of Methoxycarbowax 750 dissolved in 150 g of N-methylpyrrolidone, 127.6 g of 2,4-tolune diisocyanate was added over a thirty minute period at 30° C. At the end of the reaction, the isocyanate content was 3.56%. The system was cooled to 25° C. and 63 g of diethanolamine was added. The diol had a OH number of 109.

EXAMPLE 17

A polyurethane was prepared as described in Example 16 except toluene diisocyanate was used. The following amounts were used to prepare the urethane:

| | |
|---|---|
| Propylene oxide diol (OH number 112) | 62.8 |
| Dispersing diol from Example 16 | 40.0 |
| N-Methyl diethanolamine | 5.47 |
| N-Methylpyrrolidone | 53.3 |
| Methyl ethyl ketone | 10.6 |
| Toluene diisocyanate | 41.0 |
| Hydrazine | 1.73 |
| Water | 216 |

The polyurethane dispersion had a pH of 7.2, viscosity of 212 cps and a solids content of 35%.

EXAMPLE 18

A polyurethane was prepared as described in Example 17 except polytetramethylene ether glycol (PTMEG) was used. The following amounts were used to prepare the urethane:

| | |
|---|---|
| PTMEG (T-1000) (OH number 113) | 75.3 |
| Dispersing diol from Example 16 | 39.0 |
| N-Methyl diethanolamine | 5.47 |
| N-Methylpyrrolidone | 60.0 |
| Methyl ethyl Ketone | 11.8 |
| Toluene diisocyanate | 44.7 |
| Hydrazine | 1.85 |
| Water | 231 |

The polyurethane dispersion had pH of 6.8, viscosity of 204 cps, and a solids content of 35%. A solids content of 40% had a viscosity of 2300 cps.

EXAMPLE 19

A polyurethane was prepared as described in Example 18 except isophorone diisocyanate was used. The following amounts were used to prepare the urethane:

| | |
|---|---|
| PTMEG (T-1000) (OH number 113) | 75.3 |
| Dispersing diol | 40.0 |
| N-Methyl diethanolamine | 5.47 |
| N-Methylpyrrolidone | 38.0 |
| Methyl ethyl ketone | 38.0 |
| Isophorone diisocyanate | 57.0 |
| Hydrazine | 2.76 |
| Water | 254.0 |

The polyurethane dispersion had a pH of 6.8, viscosity of 53 cps and a solids content of 35%.

The dispersing diol used in this example was prepared as follows:

1294 g of Methoxycarbowax dissolved in 388.2 g of methyl ethyl ketone was added to 383 g of isophorone diisocyanate at 25° C. 1.7 g of dibutyltin dilaurate was added and the system exothermed to 35° C. After one hour, the NCO percent dropped to 3.43. At this point the remaining isocyanate was reacted with 168.4 g of diethanolamine. The diol had an OH number of 104.

EXAMPLE 20

A polyurethane was prepared as described in Example 19 except trimethylol propane (TMP) was used. The following amounts were used to prepare the urethane:

| | |
|---|---|
| PTMEG (T-1000) | 75.3 |
| Dispersing diol from Example 19 | 45.0 |
| N-Methyl diethanolamine | 5.47 |
| Trimethylolpropane | 2.0 |
| Isophorone diisocyanate | 66.6 |
| N-Methylpyrrolidone | 41.6 |
| Methyl ethyl ketone | 41.6 |
| Hydrazine | 3.14 |
| Water | 278.0 |

The polyurethane dispersion had a pH of 6.8, viscosity of 43 cps, and a solids content of 35%.

A post crosslinking of the unneutralized or unquaternized tertiary amine in the backbone of the polymer using dihalogeno compounds such as dibromobutenediol improved the physical properties of the coating.

| | % Elong. | Tensile | 100% | 200% | 300% |
|---|---|---|---|---|---|
| Unneutralized or unquaternized tertiary amine | 520 | 1283 | 359 | 457 | 609 |
| Quaternized or post crosslinked tertiary amine | 660* | 2314 | 336 | 429 | 586 |
| Improved properties | | | 80–85% | | |

*The unexpected increase in the permanent elongation with post crosslinking is believed to be a result of molecular orientation.

We claim:

1. An aqueous dispersion of a nonionic, water-dispersible polyurethane having pendent polyoxyethylene chains and free acid or free tertiary amino groups.

2. An aqueous dispersion according to claim 1 wherein the polyurethane has a free acid group content in the range from 5 to 185 milliequivalents per 100 grams.

3. An aqueous dispersion according to claim 2 wherein the free acid group content is in the range from 10 to 100 milliequivalents per 100 g.

4. An aqueous dispersion according to claim 1 wherein the polyurethane has a free tertiary amino group content in the range from 8 to 180 milliequivalents per 100 grams.

5. An aqueous dispersion according to claim 4 wherein the free tertiary amino group content is in the range from 15 to 100 milliequivalents per 100 grams.

6. An aqueous dispersion according to claim 1 wherein the polyurethane is linear or has up to one crosslink for each 3000 atomic weight units.

7. An aqueous dispersion according to claim 1 wherein the nonionic, water-dispersible polyurethane is the reaction product of:
(a) a nonionic, water-dispersible, isocyanate-terminated polyurethane prepolymer formed by reacting:
(i) an organic polyisocyanate;
(ii) at least one organic polyol having a molecular weight in the range 62 to 6000;
(iii) a dispersing diol and/or diisocyanate having a pendent polyoxyethylene chain, and
(iv) an isocyanate-reactive compound containing at least one carboxylic acid group and at least two groups which are more reactive than carboxylic acid groups towards isocyanate groups; and
(b) an active hydrogen containing chain extender.

8. An aqueous dispersion according to claim 7 wherein the nonionic, water-dispersible polyurethane is the reaction product of:
(a) a nonionic, water-dispersible, isocyanate-terminated polyurethane prepolymer formed by reacting:
(i) an organic polyisocyanate;
(ii) a polymeric polyol having a molecular weight in the range 400 to 6000;
(iii) a dispersing diol and/or diisocyanate having a pendent polyoxyethylene chain:
(iv) an isocyanate-reactive compound containing at least one carboxylic acid group and at least two groups which are more reactive than carboxylic acid groups towards isocyanate groups; and optionally,
(v) a low molecular weight polyol having a molecular weight less than 400; and
(b) an active hydrogen containing chain extender.

9. An aqueous dispersion according to claim 8 wherein the polymeric polyol has a molecular weight of from 700 to 3000.

10. An aqueous dispersion according to claim 7 wherein the diol having a pendent polyoxyethylene chain is a product obtained by reacting one mole of an organic diisocyanate in which the two isocyanate groups have different reactivities with approximately one mole of a polyethylene glycol monoether and then reacting the adduct so obtained with approximately one mole of a dialkanolamine.

11. An aqueous dispersion according to claim 7 wherein the carboxy group containing isocyanate-reactive compound is a dihydroxy alkanoic acid of the formula:

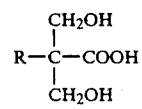

wherein R is hydrogen or alkyl.

12. An aqueous dispersion according to claim 1 wherein the nonionic, water-dispersible polyurethane is the reaction product of:
(A) a nonionic, water-dispersible, isocyanate-terminated polyurethane prepolymer formed by reacting:
(i) an organic polyisocyanate;
(ii) at least one organic polyol having a molecular weight in the range 62 to 6000, and
(iii) a dispersing diol and/or diisocyanate having a pendent polyoxyethylene chain; and
(B) an active hydrogen containing chain extender, wherein at least one of the polyols and/or chain extender contains a free tertiary amino group.

13. An aqueous dispersion according to claim 12 wherein the nonionic, water-dispersible polyurethane is the reaction product of:
(A) a nonionic, water-dispersible, isocyanate-terminated polyurethane prepolymer formed by reacting:
(i) an organic polyisocyanate;
(ii) a polymeric polyol having a molecular weight in the range 400 to 6000, and
(iii) a dispersing diol and/or diisocyanate having a pendent polyoxyethylene chain; and optionally,
(iv) a low molecular weight polyol having a molecular weight less than 400; and
(B) an active hydrogen containing chain extender, wherein at least one of the polyols and/or chain extender contains free tertiary amino groups.

14. An aqueous dispersion according to claim 13 wherein the polymeric polyol has a molecular weight of from 700 to 3000.

15. An aqueous dispersion according to claim 12 wherein the diol having a pendent polyoxyethylene chain is a product obtained by reacting one mole of an organic diisocyanate in which the two isocyanate groups have different reactivities with approximately one mole of a polyethylene glycol mono-ether and then reacting the adduct so obtained with approximately one mole of a dialkanolamine.

* * * * *